D. G. WHITE.
HAND PROTECTOR FOR AUTOMOBILE DRIVERS.
APPLICATION FILED JAN. 8, 1917.
1,251,313.
Patented Dec. 25, 1917.
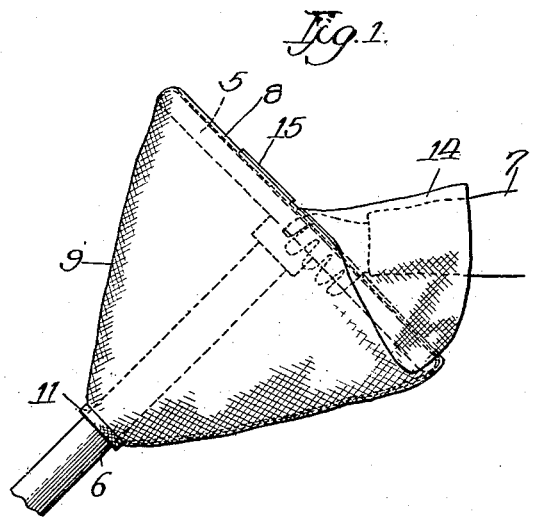
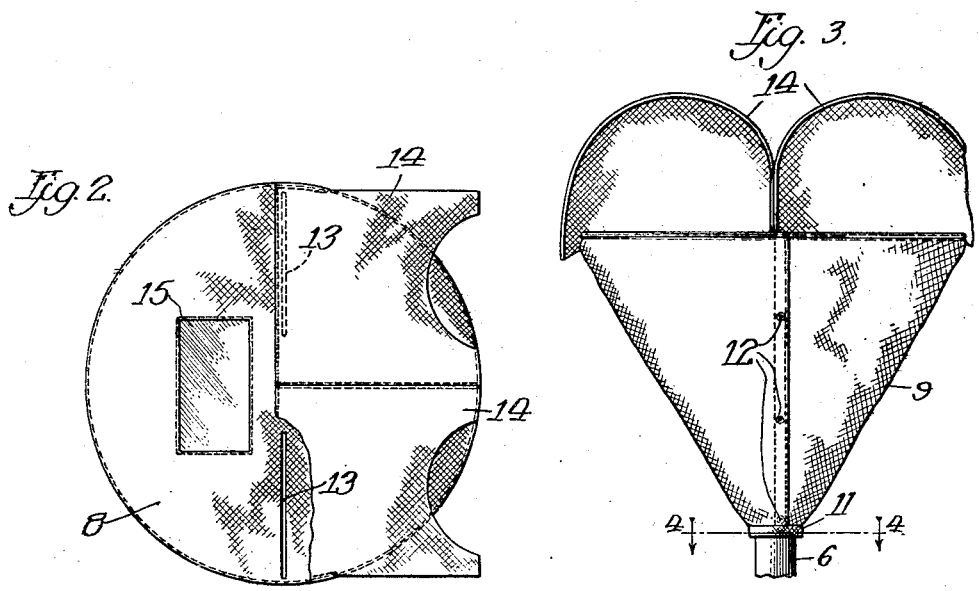
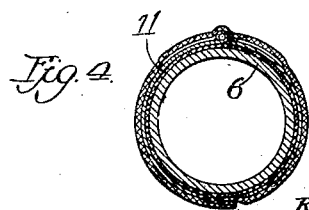

UNITED STATES PATENT OFFICE.

DOUGLAS G. WHITE, OF CHICAGO, ILLINOIS.

HAND-PROTECTOR FOR AUTOMOBILE-DRIVERS.

1,251,313.  Specification of Letters Patent.  Patented Dec. 25, 1917.

Application filed January 8, 1917. Serial No. 141,135.

*To all whom it may concern:*

Be it known that I, DOUGLAS G. WHITE, a subject of the King of Great Britain, residing at Chicago, county of Cook, and State of Illinois, have invented certain new and useful Improvements in Hand-Protectors for Automobile-Drivers, of which the following is a specification.

It is a fact well known to automobile drivers that when driving in cold weather, particularly in open cars, their hands become uncomfortably cold, even when protected by gloves or mittens. This is due largely to the fact that the cold wind blows freely around the exposed hands grasping the steering wheel, thereby rapidly carrying away the heat from the hands.

One of the primary objects of my present invention is to increase the comfort and pleasure of cold weather driving by providing a protector for the driver's hands which will effectually shield them from the wind and also prevent the wind from blowing up the driver's sleeves, thereby maintaining the hands in warm and comfortable condition, even in extremely cold temperatures.

With this end in view I have provided a protector which can be easily and quickly attached to a steering wheel when its use is desirable and can also be readily removed and stored away in a very small space when its use is unnecessary.

A further object of my invention is to provide a protector of the character indicated which will not interfere with the movements of the driver's hands in steering the car, which will not obstruct his observation of the position of the throttle and spark levers on the steering post, which will cover not only the driver's hands but also the forearms, so as to preclude the wind from blowing up his sleeves, and also provide a protector which will be of simple construction, cheap to manufacture and which will be efficient and durable in use.

For the purpose of facilitating an understanding of my invention I have illustrated on the accompanying drawings one practical and preferred embodiment thereof, from an inspection of which, when considered in connection with the following description, my invention and many of its attendant advantages should be readily understood. Referring to the drawings—

Figure 1 is a side view of a steering wheel equipped with my invention;

Fig. 2 is a top view looking along the axis of the steering post;

Fig. 3 is a bottom view looking across the axis of the steering post; and

Fig 4 is a sectional view taken on the line 4—4 of Fig. 3.

On the drawings reference character 5 indicates a steering wheel of any well known form supported in the usual manner upon the steering post 6. The driver's hands in their customary position when driving are indicated by reference character 7.

The protector itself consists of a covering which may be made of any suitable flexible material, such as woven or knitted cloth, felt, leather, rubber cloth, fur, or other preferred material. This covering is shaped preferably by cutting and sewing into substantially conical form, so as to provide a circular top 8 of approximately the diameter of the steering wheel, and the sides or bottom 9. The lower end of the protector is preferably equipped with a jointed expansion ring 11 sewed into the material of the protector, as shown in Fig. 4, this ring being of suitable size to rather snugly embrace the steering post 6 so as to prevent the wind from entering the protector along the post. When the covering is made of heavy material this ring may be omitted and the opening which receives the steering post may be strengthened by hemming the material. The inclined portion 9 of the protector is open at one side from the ring 11 to the top portion 8 in order to permit the protector to be readily slipped into position over the steering wheel, and when positioned as shown in Fig. 1, this open side is closed by detachable fastening devices 12, such as buttons, glove fasteners or the like.

It will be observed that the protector overlies the top face of the wheel and extends downwardly along the steering post so that the wheel is entirely surrounded and inclosed by the protector. In order to afford access to the steering wheel the top portion 8 is provided with a pair of hand-openings 13 through which the driver's hands may be inserted so that the wheel may be grasped for steering purposes, as shown in Fig. 1. Adjacent each of the openings 13 I have secured, preferably by stitching, a cuff 14, which may be either of the same material as the protector proper or of other preferred material, these cuffs being adapted to extend outwardly and rearwardly from the protector over the driver's forearms so as to prevent the wind from blowing up his sleeves.

In order to provide for unobstructed observation of the spark and throttle levers, which are usually mounted on the steering post just beneath or above the steering wheel, the top 8 is provided with a transparent window 15, which may be made of mica, celluloid or the like, so that these levers may be visible when the protector is being used.

When the use of this protector is desired it may be quickly positioned by simply slipping it over the wheel and buttoning up the open side, and when in use the driver can readily insert his hands into the protector, within the cuffs, and through the hand openings, and can also readily withdraw them whenever occasion requires. The protector affords ample protection for the driver's hands and wrists, shields them from the wind and maintains them in a warm and comfortable condition without in any way interfering with the turning of the wheel or with the movements of the hands in steering the car. When not in use the protector may be rolled up into small space and carried in the car.

It is believed that my invention and many of its attendant advantages will be readily appreciated from the foregoing without further description, but it should be obvious that the structural details are capable of considerable modification and variation without departing from the essence of the invention as defined in the following claims.

I claim:

1. A protector comprising a covering shaped to loosely surround and entirely inclose a steering wheel, the top of said protector being provided with openings disposed within the perimeter of the covering through which a driver's hands may be inserted into said protector.

2. A protector comprising a covering of flexible material shaped to entirely inclose a steering wheel, the top of said protector being provided above the wheel with substantially radially disposed hand openings and cuffs adjacent to said openings into which the driver's hands may be inserted.

3. A protector comprising a flexible conical covering shaped to receive and loosely surround a steering wheel, the top of said protector being provided with hand openings and cuffs extending outwardly therefrom into which a driver's hands may be inserted, and also provided with a transparent window through which the throttle and spark levers may be observed by the driver.

4. A protector comprising a steering wheel and flexible covering of substantially conical shape adapted to loosely fit over a steering post, the top of said protector being provided within the perimeter of the wheel with hand openings, cuffs secured to said protector in proximity to said openings, and means for detachably securing said protector in position.

5. A protector comprising a conical shaped covering adapted to completely surround and inclose a steering wheel and a portion of a steering post, the circular top of said covering being provided with a pair of transversely extending substantially radially disposed hand-receiving openings, and cuffs secured to said top in front of and at the sides of said openings and extending rearwardly therefrom.

DOUGLAS G. WHITE.

Copies of this patent may be obtained for five cents each, by addressing the "Commissioner of Patents, Washington, D. C."